United States Patent
Hori

(10) Patent No.: US 11,798,708 B2
(45) Date of Patent: Oct. 24, 2023

(54) MULTICORE CABLE AND HARNESS

(71) Applicant: SUMITOMO ELECTRIC INDUSTRIES, LTD., Osaka (JP)

(72) Inventor: Kenji Hori, Tochigi (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 125 days.

(21) Appl. No.: 17/594,967

(22) PCT Filed: Jul. 22, 2020

(86) PCT No.: PCT/JP2020/028482
§ 371 (c)(1),
(2) Date: Nov. 4, 2021

(87) PCT Pub. No.: WO2021/039222
PCT Pub. Date: Mar. 4, 2021

(65) Prior Publication Data
US 2022/0310283 A1    Sep. 29, 2022

(30) Foreign Application Priority Data

Aug. 30, 2019    (JP) .................. 2019-158559

(51) Int. Cl.
*H01B 7/02*    (2006.01)
*H01B 7/28*    (2006.01)
*H01B 7/00*    (2006.01)
*H01B 7/29*    (2006.01)
*B60R 16/02*    (2006.01)

(52) U.S. Cl.
CPC ......... *H01B 7/0216* (2013.01); *H01B 7/0045* (2013.01); *H01B 7/2813* (2013.01); *H01B 7/292* (2013.01); *B60R 16/0207* (2013.01)

(58) Field of Classification Search
CPC . B60R 16/0207; B60R 16/0215; H01B 3/443; H01B 3/445
See application file for complete search history.

(56) References Cited

U.S. PATENT DOCUMENTS

2017/0327708 A1 * 11/2017 Yaguchi ............... C09D 127/18
2018/0114610 A1    4/2018 Jegaki et al.
2018/0301239 A1 * 10/2018 Murao .................... H01B 7/02

FOREIGN PATENT DOCUMENTS

JP    2017-183173    10/2017
JP    2017-188431    10/2017
JP    2017-204436    11/2017

* cited by examiner

*Primary Examiner* — Paresh Paghadal
(74) *Attorney, Agent, or Firm* — IPUSA, PLLC

(57) ABSTRACT

A multicore cable includes a plurality of sheathed wires, and a second cover layer covering an outer periphery of the plurality of sheathed wires, wherein the sheathed wire includes a conductor, and a first cover layer covering the conductor, the first cover layer is a crosslinked fluoroelastomer or a crosslinked fluororesin, and the second cover layer is a crosslinked fluoroelastomer.

4 Claims, 2 Drawing Sheets

MULTICORE CABLE AND HARNESS

TECHNICAL FIELD

The present disclosure relates to multicore cables, and harnesses.

This application is based upon and claims priority to Japanese Patent Application No. 2019-158559 filed on Aug. 30, 2019, the entire contents of which are incorporated herein by reference.

BACKGROUND ART

For example, Patent Document 1 describes an insulated cable having a conductor, and an insulator covering an outer periphery of the conductor, wherein the conductor has a cross sectional area of 0.4 mm² or smaller, and the insulator includes a polymer having S or F as the backbone, and the insulator has a thickness of 0.05 mm or greater and a wire density of 3.1 g/cm³ or higher.

PRIOR ART DOCUMENTS

Patent Documents

Patent Document 1: Japanese Laid-Open Patent Publication No. 2017-183173

DISCLOSURE OF THE INVENTION

A multicore cable according to the present disclosure includes a plurality of sheathed wires, and a second cover layer covering an outer periphery of the plurality of sheathed wires, wherein the sheathed wire includes a conductor, and a first cover layer covering the conductor, the first cover layer is a crosslinked fluoroelastomer or a crosslinked fluororesin, and the second cover layer is a crosslinked fluoroelastomer.

MODE OF CARRYING OUT THE INVENTION

Figure 1:
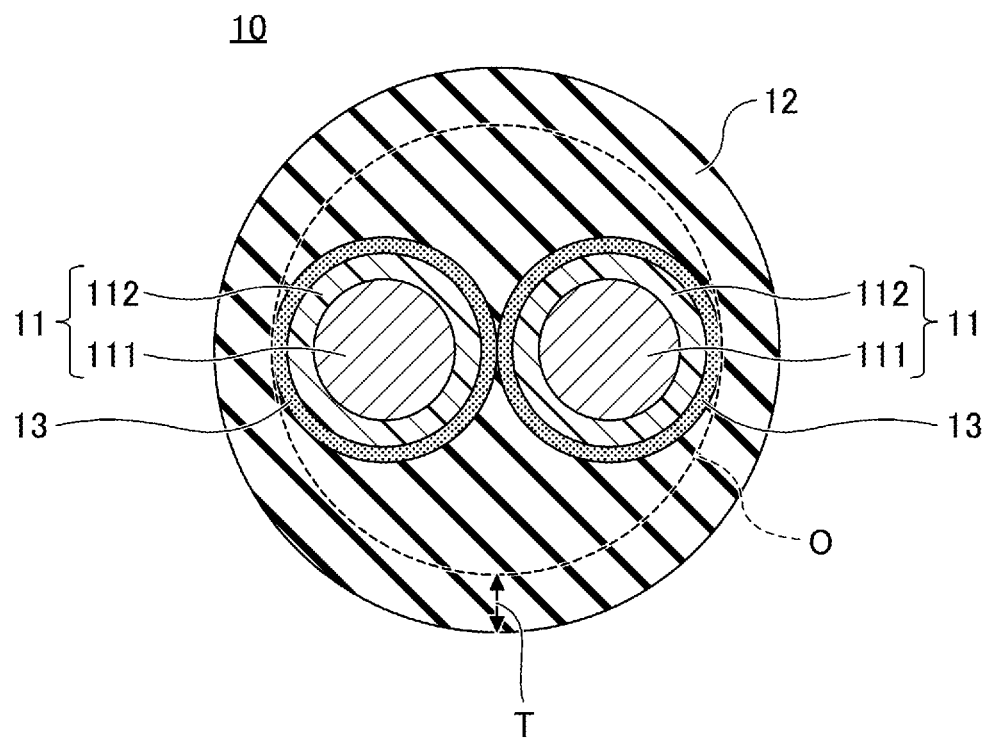
FIG. 1 is a cross sectional view at a plane perpendicular to a longitudinal direction of a multicore cable according to one aspect of the present disclosure.

Problem to be Solved by the Present Disclosure

In cables used inside devices of automobiles and for wirings between the devices, there are demands for multicore cables, so that a plurality of terminals can be connected by a single cable. Particularly, there are demands for multicore cables having heat resistance and chemical resistance, because at locations in a periphery of an engine or the like inside the automobile, for example, the temperature may become high, and the cable may make contact with various chemicals such as oil or the like.

Hence, one object according to the present disclosure is to provide a multicore cable having heat resistance and chemical resistance.

Effects of the Present Disclosure

According to the present disclosure, it is possible to provide a multicore cable having heat resistance and chemical resistance.

Description of Embodiments of the Present Disclosure

First, embodiments of the present disclosure will be described with reference to examples. In the following description, the same or corresponding elements are designated by the same reference numerals, and a description of the same or corresponding elements will not be repeated.

(1) A multicore cable according to one aspect of the present disclosure includes a plurality of sheathed wires, and a second cover layer covering an outer periphery of the plurality of sheathed wires, wherein the sheathed wire includes a conductor, and a first cover layer covering the conductor, the first cover layer is a crosslinked fluoroelastomer or a crosslinked fluororesin, and the second cover layer is a crosslinked fluoroelastomer.

The multicore cable according to one aspect of the present disclosure includes, as resin layers covering conductors, two layers including the first cover layer included in the sheathed wire, and the second cover layer covering the plurality of sheathed wires.

In addition, by using the crosslinked material as a material used for the first cover layer and the second cover layer, a decomposition temperature increases, thereby making it is possible to obtain a multicore cable having an excellent heat resistance.

Moreover, because both the crosslinked fluororesin and the crosslinked fluoroelastomer are fluorine-based resins or elastomers, these materials have an excellent chemical resistance. For this reason, by forming the multicore cable to include such first and second cover layers, it is possible to obtain a multicore cable having an excellent chemical resistance.

The crosslinked fluoroelastomer or the crosslinked fluororesin may be used for the first cover layer, but when the crosslinked fluororesin is used, it is possible to obtain a layer having a particularly high hardness. For this reason, when the crosslinked fluororesin is used for the first cover layer, it is particularly possible to prevent the inner conductor from collapsing, breaking, or the like even when a force is applied to the multicore cable from the outside.

Because the crosslinked fluoroelastomer is soft compared to the crosslinked fluororesin, it is possible to increase the handling ease of the multicore cable, by using the crosslinked fluoroelastomer for the second cover layer which forms an outer periphery of the multicore cable.

(2) An adhesion of the second cover layer with respect to the first cover layer may be in a range greater than or equal to 20 N and less than or equal to 150 N per 35 mm in length.

When the adhesion of the second cover layer with respect to the first cover layer is less than or equal to 150 N per 35 mm in length, it is possible to increase the peelability of the second cover layer from the plurality of sheathed wires, and increase the workability when connecting a connector or the like to an end of the multicore cable.

When the adhesion of the second cover layer with respect to the first cover layer is greater than or equal to 20 N per 35 mm in length, it is possible to sufficiently increase the adhesion of the second cover layer with respect to the plurality of sheathed wires, and particularly increase the chemical resistance.

(3) A lubricant may be disposed between the first cover layer and the second cover layer.

The adhesion of the second cover layer with respect to the first cover layer can be adjusted, by disposing the lubricant between the first cover layer and the second cover layer. By providing the lubricant, it is possible to increase the peelability of the second cover layer from the sheathed wires, and increase the workability when connecting the connector or the like to the end of the multicore cable.

(4) The plurality of sheathed wires may be twisted, and have a twist pitch in a range greater than or equal to 5 mm and less than or equal to 60 mm.

When the twist pitch of the plurality of sheathed wires is less than or equal to 60 mm, it is possible to sufficiently increase the adhesion of the second cover layer with respect to the plurality of sheathed wires, and particularly increase the chemical resistance. In addition, it is possible to increase the noise resistance.

When the twist pitch of the plurality of sheathed wires is greater than or equal to 5 mm, it is possible to increase the peelability of the second cover layer from the plurality of sheathed wires, and increase the workability when connecting the connector or the like to the end of the multicore cable. Moreover, it is possible to increase the productivity when twisting the plurality of sheathed wires together.

(5) A thickness of the second cover layer may be in a range greater than or equal to 0.1 mm and less than or equal to 0.6 mm.

When the thickness of the second cover layer is greater than or equal to 0.1 mm, it is possible to sufficiently protect the sheathed wires, and increase the durability. When the thickness of the second cover layer is less than or equal to 0.6 mm, it is possible to more easily bend the multicore cable, and reduce the weight of the multicore cable. In addition, because the cord diameter of the multicore cable can be reduced, it is possible to reduce the space required to install the multicore cable.

(6) A harness according to one aspect of the present disclosure includes the multicore cable according to any one of (1) to (5) above; and connectors disposed at both ends along a longitudinal direction of the multicore cable.

Because the harness according to one aspect of the present disclosure uses the multicore cable described above, the harness can have excellent heat resistance and excellent chemical resistance. Moreover, because the multicore cable includes the plurality of sheathed wires, it is possible to simultaneously connect a plurality of terminals, thereby facilitating the wiring.

Details of Embodiments of the Present Disclosure

Specific examples of the multicore cable and the harness according to one embodiment of the present disclosure (hereinafter referred to as "present embodiment") will be described below, with reference to the drawings. However, the present invention is not limited to these examples and claims, and may include all modifications within the meaning and scope of the claims and equivalents thereof.

1. Multicore Cable

As illustrated in FIG. 1, a multicore cable 10 according to the present embodiment may include a plurality of sheathed wires 11, and a second cover layer 12 covering an outer periphery of the plurality of sheathed wires 11, wherein the sheathed wire 11 may include a conductor 111, and a first cover layer 112 covering the conductor 111.

The first cover layer 112 may be a crosslinked fluoroelastomer or a crosslinked fluororesin, and the second cover layer 12 may be a crosslinked fluoroelastomer.

The inventor of the present invention diligently conducted studies on multicore cables including multiple wires having heat resistance and chemical resistance. As a result, it was found that a multicore cable having the heat resistance and the chemical resistance can be obtained, by forming the first cover layer which covers the conductor of the sheathed wire using the crosslinked fluoroelastomer or the crosslinked fluororesin, and forming the second cover layer which covers the plurality of sheathed wires using the crosslinked fluoroelastomer, thereby completing the present invention.

Hereinafter, each member of the multicore cable according to the present embodiment will be described.

(1) Sheathed Wire

The sheathed wire 11 may include the conductor 111, and the first cover layer 112 covering the conductor 111.

(Conductor)

The conductor 111 may be formed of a single metal wire or a plurality of metal wires. If the conductor 111 has the plurality of metal wires, the plurality of metal wires may be twisted together. In other words, if the conductor 111 has the plurality of metal wires, the conductor 111 may be a twisted wire made up of the plurality of metal wires.

The conductor 111 may have a circular outer shape in a cross section perpendicular to a longitudinal direction. The conductor having the circular outer shape may be formed by compressing a conductor in a circular shape along a radial direction. In addition, the conductor 111 may have surface irregularities along the outer shape of the plurality of metal wires.

The material used for the conductor 111 is not particularly limited, and one or more generally used conductor materials selected from copper, soft copper, silver plated soft copper, nickel plated soft copper, tin plated soft copper, or the like, for example, may be used.

(First Cover Layer)

The material used for the first cover layer 112 is preferably a crosslinked fluoroelastomer or a crosslinked fluororesin. The fluororesin used for the first cover layer 112 is preferably ETFE, which is a copolymer of ethylene and tetrafluoroethylene. The fluoroelastomer will be described in conjunction with the second cover layer.

The first cover layer 112 may be the crosslinked fluoroelastomer which is a fluoroelastomer that is crosslinked, or the crosslinked fluororesin which is a fluoroelastomer that is crosslinked, by covering the outer surface of the conductor 111 with the fluoroelastomer or the fluororesin, and thereafter performing a crosslinking treatment using ionizing radiation, such as γ radiation, electron radiation, or the like. The crosslinking treatment using ionizing radiation may be performed on the second cover layer 12 which will be discussed later. When performing the crosslinking treatment using ionizing radiation on the second cover layer 12, the ionizing radiation penetrates into the interior of the multicore cable 10, thereby also subjecting the first cover layer 112 to the crosslinking treatment.

For this reason, the first cover layer 112 is subjected to a first crosslinking treatment when performing the crosslinking treatment on the first cover layer 112, and a second crosslinking treatment when performing the crosslinking treatment on the second cover layer. Accordingly, the first cover layer 112 may be the crosslinked fluoroelastomer or the crosslinked fluororesin, subjected to two crosslinking treatments.

The multicore cable 10 according to the present embodiment may have the plurality of sheathed wires 11. The number of the sheathed wires 11 of the multicore cable 10 according to the present embodiment is not particularly limited, and may be an arbitrary number according to the device or the like to which the connection is to be made. The multicore cable 10 according to the present embodiment may include two or more sheathed wires 11, for example.

The plurality of sheathed wires 11 of the multicore cable 10 according to the present embodiment may be twisted together. By twisting the plurality of sheathed wires 11, and selecting the twist pitch, it is possible to adjust an adhesion strength (adhesion) between the plurality of sheathed wires 11 and the second cover layer 12.

When the plurality of sheathed wires 11 is twisted, the twist pitch is not particularly limited, but the twist pitch is preferably in a range greater than or equal to 5 mm and less than or equal to 60 mm, more preferably in a range greater than or equal to 10 mm and less than or equal to 50 mm, and even more preferably in a range greater than or equal to 10 mm an less than or equal to 40 mm, for example.

When the twist pitch of the plurality of sheathed wires 11 is less than or equal to 60 mm, it is possible to sufficiently increase the adhesion of the second cover layer 12 with respect to the plurality of sheathed wires 11, and particularly increase the chemical resistance. In addition, it is possible to increase the noise resistance.

Further, when the twist pitch of the plurality of sheathed wires 11 is less than or equal to 5 mm, it is possible to increase the peelability of the second cover layer 12 from the plurality of sheathed wires 11, and increase the workability when connecting the connector or the like to the end of the multicore cable. Moreover, it is possible to increase the productivity when twisting the plurality of sheathed wires 11 together.

The twist pitch can be measured by the method described in JIS C 3002 (1992).

(2) Second Cover Layer

The multicore cable 10 according to the present embodiment may include the second cover layer 12 covering the plurality of sheathed wires 11. As illustrated in FIG. 1, the second cover layer 12 can cover all of the plurality of sheathed wires 11 together, that is, collectively cover the plurality of sheathed wires 11.

The material used for the second cover layer 12 is preferably the crosslinked fluoroelastomer.

A material selected from a tetrafluoroethylene/propylene copolymer (hereinafter referred to as "TFE-P copolymer"), a vinylidene fluoride rubber (hereinafter referred to as "FKM"), a mixture of a TFE-P copolymer and an ethylene/tetrafluoroethylene copolymer (hereinafter referred to as "E-TFE copolymer"), and a mixture of FKM and polyvinylidene fluoride (PVDF), for example, is preferably used as the fluoroelastomer. When using the fluoroelastomer for the first cover layer 112, the fluoroelastomer is preferably also selected from the materials described above.

The second cover layer 12 may be the crosslinked fluoroelastomer which is a fluoroelastomer that is crosslinked, by covering the outer surface of the plurality of sheathed wires 11 with the fluoroelastomer, and thereafter performing the crosslinking treatment using the ionizing radiation, such as the y radiation, the electron radiation, or the like.

The thickness of the second cover layer 12 is not particularly limited, but is preferably in a range greater than or equal to 0.1 mm and less than or equal to 0.6 mm, and more preferably in a range greater than or equal to 0.2 mm and less than or equal to 0.5 mm, for example.

When the thickness of the second cover layer 12 greater than or equal to 0.1 mm, it is possible to sufficiently protect the sheathed wires 11, and increase the durability. When the thickness of the second cover layer 12 is less than or equal to 0.6 mm, it is possible to more easily bend the multicore cable, and reduce the weight of the multicore cable. In addition, because the cord diameter of the multicore cable can be reduced, it is possible to reduce the space required to install the multicore cable.

A thickness T of the second cover layer 12 refers to the thickness at a location where the second cover layer 12 becomes the thinnest. For this reason, a distance between a circumscribed circle 0 of the plurality of sheathed wires 11, and the outer surface of the second cover layer 12, may be defined as the thickness T of the second cover layer 12. In addition, when the lubricant 13 which will be described later is provided, the distance between the circumscribing circle O of the plurality of sheathed wires 11 having a lubricant 13 provided thereon, and the outer surface of the second cover layer 12, may be set to the thickness T of the second cover layer 12, as illustrated in FIG. 1.

As described above, the multicore cable according to the present embodiment includes, as the two resin layers covering the conductor 111, the first cover layer 112 included in the sheathed wire 11, and the second cover layer 12 covering the plurality of sheathed wires 11.

By using the crosslinked material for both the first cover layer 112 and the second cover layer 12, it is possible to obtain a multicore cable having an excellent heat resistance, because the decomposition temperature becomes high.

In addition, because both the crosslinked fluororesin and the crosslinked fluoroelastomer are fluorine-based resins or elastomers, the crosslinked fluororesin and the crosslinked fluoroelastomer have an excellent chemical resistance. For this reason, by providing the multicore cable with such first cover layer 112 and second cover layer 12, it is possible to obtain a multicore cable having the excellent chemical resistance.

The crosslinked fluoroelastomer or the crosslinked fluororesin may be used for the first cover layer, but when the crosslinked fluororesin is used, it is possible to obtain a layer having a particularly high hardness. For this reason, when the crosslinked fluororesin is used for the first cover layer, it is particularly possible to prevent the inner conductor from collapsing, breaking, or the like even when a force is applied to the multicore cable from the outside.

Because the crosslinked fluoroelastomer is soft compared to the crosslinked fluororesin, it is possible to increase the handling ease of the multicore cable, by using the crosslinked fluoroelastomer for the second cover layer 12 which forms the outer periphery of the multicore cable.

Further, when the crosslinked fluororesin is used for the first cover layer 112, and the crosslinked fluoroelastomer is used for the second cover layer 12, that is, different materials are used for the two cover layers, for example, it is possible to particularly reduce fusing of the first cover layer 112 and the second cover layer 12 when heat is applied to form the second cover layer 12. For this reason, it is possible to increase the peelability of the second cover layer 12 from the sheathed wire 11, and increase the workability when connecting the connector or the like to the end of the multicore cable.

The multicore cable according to the present embodiment may further include an arbitrary member other than those described above.

The multicore cable according to the present embodiment may also include the lubricant. More particularly, the multicore cable according to the present embodiment may be configured to include the lubricant 13 disposed between the first cover layer 112 and the second cover layer 12, that is, on the surface of the plurality of sheathed wires 11, for example.

By providing the lubricant 13 between the first cover layer 112 and the second cover layer 12, it is possible to adjust the adhesion of the second cover layer 12 with respect to the first cover layer 112. By providing the lubricant 13, it is possible to increase the peelability of the second cover layer 12 from the sheathed wires 11, and increase the workability when connecting the connector or the like to the end of the multicore cable.

The material used for the lubricant 13 is not particularly limited, and talc or the like, for example, may be used.

In the multicore cable according to the present embodiment, the adhesion of the second cover layer with respect to the first cover layer is preferably in a range greater than or equal to 20 N and less than or equal to 150 N, more preferably in a range greater than or equal to 25 N and less than or equal to 125 N, and even more preferably in a range greater than or equal to 25 N and less than or equal to 100 N, per 35 mm in length.

When the adhesion of the second cover layer with respect to the first cover layer is less than or equal to 150 N per 35 mm in length, it is possible to increase the peelability of the second cover layer 12 from the plurality of sheathed wires 11, and increase the workability when connecting the connector or the like to the end of the multicore cable.

When the adhesion of the second cover layer with respect to the first cover layer is greater than or equal to 20 N per 35 mm in length, it is possible to sufficiently increase the adhesion of the second cover layer 12 with respect to the plurality of sheathed wires 11, and particularly increase the chemical resistance.

Figure 3:
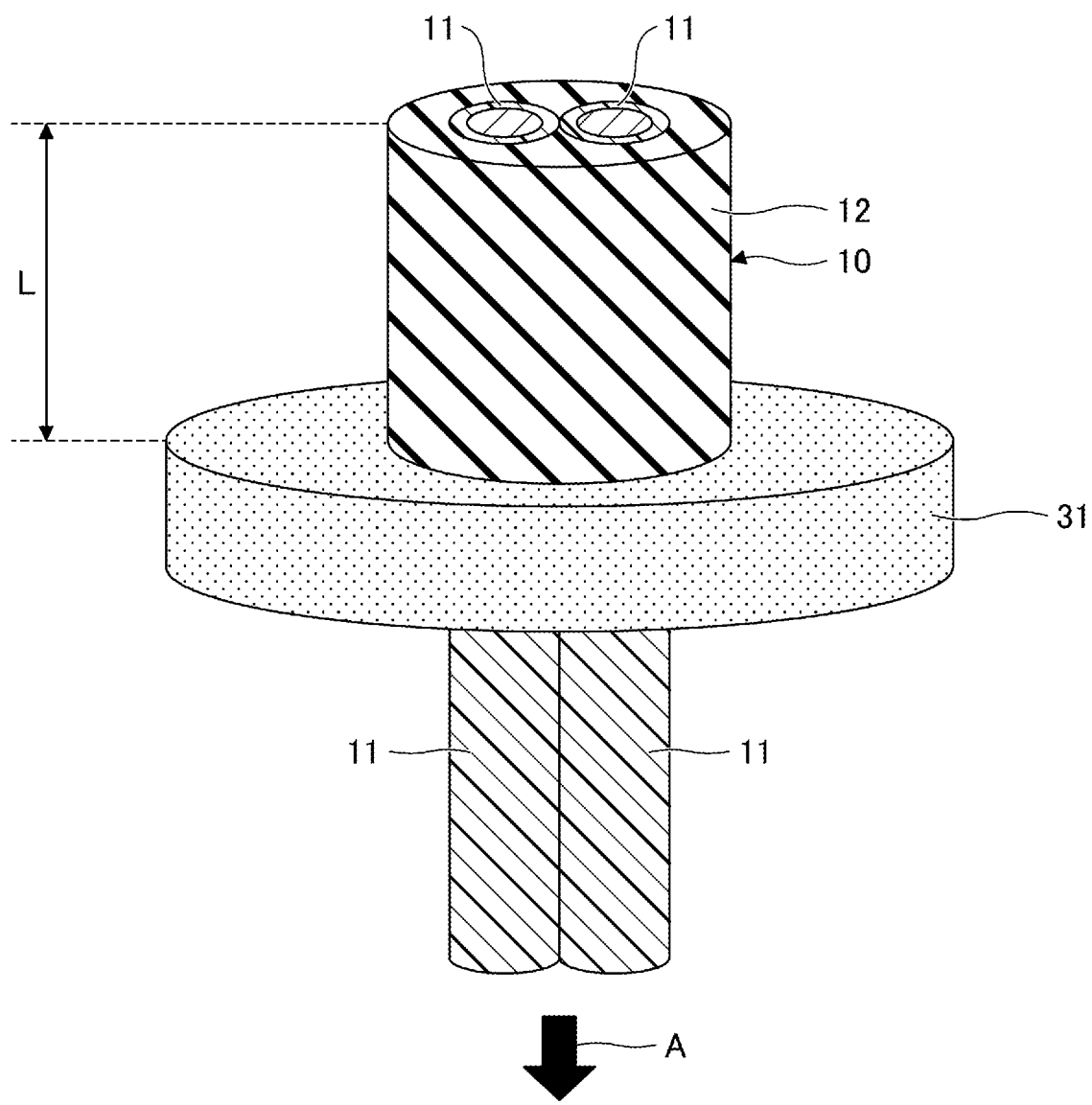
FIG. 3 is a diagram for explaining an adhesion test.

The adhesion of the second cover layer with respect to the first cover layer per 35 mm in length, can be measured using an adhesion measuring jig 31 provided with a through hole that allows only the plurality of sheathed wires 11 illustrated in FIG. 3 to pass through, for example.

First, the second cover layer 12 of the multicore cable 10, except for a portion thereof, is removed to expose the plurality of sheathed wires 11.

In this state, the portion of the second cover layer 12 remains, so that the length L of the second cover layer 12 along the longitudinal direction of the multicore cable 10 becomes 35 mm, as illustrated in FIG. 3.

The plurality of exposed sheathed wires 11 is inserted into the through hole of the adhesion measuring jig 31. Hence, the multicore cable 10 is set on the adhesion measuring jig 31, as illustrated in FIG. 3.

Next, the multicore cable 10 is pulled along an arrow A in FIG. 3, in a state where the adhesion measuring jig 31 fixed. Then, the second cover layer 12 is peeled off from the plurality of sheathed wires 11, and a magnitude of a force that is applied when the plurality of sheathed wires 11 passes through the through hole of the adhesion measuring jig 31 and moves below the adhesion measuring jig 31, is measured. The measured magnitude of the force may be the adhesion of the second cover layer with respect to the first cover layer per 35 mm length.

2. Method of Manufacturing Multicore Cable

The method of manufacturing the multicore cable according to the present embodiment is not particularly limited, and multicore cable may be manufactured by the following procedure, for example. Because the multicore cable described above can be manufactured by the method of manufacturing the multicore cable according to the present embodiment, a description thereof will be omitted in part for the matters already described above.

A first covering step covers a surface of the conductor 111 with a fluoroelastomer or a fluororesin.

A first crosslinking step performs a crosslinking treatment using ionizing radiation on the fluoroelastomer or the fluororesin disposed on the surface of the conductor 111.

A second covering step covers a surface of the plurality of sheathed wires obtained after the first crosslinking step, with a fluoroelastomer.

A second crosslinking step performs a crosslinking treatment using ionizing radiation on the fluoroelastomer disposed on the surface of the plurality of sheathed wires obtained after the first crosslinking step.

Each of the steps will be described below.

(First Covering Step)

In the first covering step, the surface of the conductor 111 may be covered with the fluoroelastomer or the fluororesin, for example. The method of covering the surface of the conductor 111 with the fluoroelastomer or the fluororesin is not particularly limited, and extrusion molding may be used, for example.

The fluoroelastomer and the fluororesin which may preferably be used have already been described, and thus, a description thereof will be omitted.

The material or the like which may preferably be used for the conductor 111 subjected to the first covering step have already been described, and thus, a description thereof will be omitted. In addition, when the conductor 111 includes a plurality of metal wires, the plurality of metal wires may be twisted in advance. Further, the conductor 111 may be famed by compressing a conductor in a circular shape along the radial direction, as appropriate.

(First Crosslinking Step)

In the first crosslinking step, the crosslinking treatment using ionizing radiation may be performed on the fluoroelastomer or the fluororesin covering the conductor 111. For example, γ radiation, electron radiation, or the like may be used for the ionizing radiation, but from a viewpoint of the handling ease, it is preferable to use the electron radiation.

(Second Covering Process)

In the second covering step, the surface of the plurality of sheathed wires 11 may be covered with the fluoroelastomer. The method of covering the surface of the plurality of sheathed wires 11 with the fluoroelastomer is not particularly limited, and extrusion molding may be used, for example. The fluoroelastomer which may preferably used have already been described, and thus, a description thereof will be omitted.

The plurality of sheathed wires 11 subjected to the second covering step may be twisted in advance. For this reason, the method of manufacturing the multicore cable according to the present embodiment may include a twisting step in which the plurality of sheathed wires 11 are twisted together, after the first crosslinking step ends and before the second covering step is performed.

In addition, the multicore cable 10 according to the present embodiment may include the lubricant 13 disposed between the first cover layer 112 and the second cover layer 12, that is, on the surface of the plurality of sheathed wires 11, as described above. For this reason, the method of manufacturing the multicore cable according to the present embodiment may include a lubricant providing step in which the lubricant is provided on the surface of the plurality of sheathed wires 11, after the first crosslinking step ends and before the second covering step is performed.

(Second Crosslinking Step)

In the second crosslinking step, the crosslinking treatment using the ionizing radiation is performed on the fluoroelastomer covering the plurality of sheathed wires 11. For example, the γ radiation, the electron radiation, or the like may be used for the ionizing radiation, but from a viewpoint of the handling ease, it is preferable to use the electron radiation.

By the method of manufacturing the multicore cable according to the present embodiment described above, it is possible to manufacture the multicore cable described above. For this reason, a multicore cable having excellent heat resistance and excellent chemical resistance can be manufactured.

3. Harness

Figure 2:
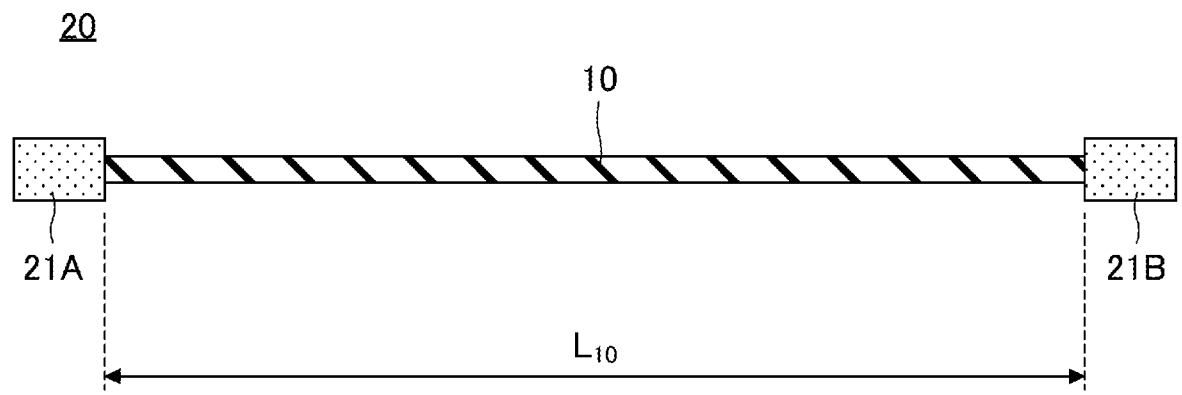
FIG. 2 is a side view of a harness according to one aspect of the present disclosure.

As illustrated in FIG. 2, a harness 20 according to the present embodiment may include the multicore cable 10 described above, and connectors 21A and 21B disposed at both ends along the longitudinal direction of the multicore cable.

Because the harness 20 according to the present embodiment uses the multicore cable 10 described above, it is possible to obtain a harness having excellent heat resistance and excellent chemical resistance. In addition, because the multicore cable 10 includes the plurality of sheathed wires, it is possible to simultaneously connect a plurality of terminals, thereby facilitating the wiring.

A length $L_{10}$ of the multicore cable 10, which connects between the connectors 21A and 21B, and is included in the harness 20 according to the present embodiment, is not particularly limited.

While the embodiments have been described in detail above, the present disclosure is not limited to specific embodiments, and various variations and modifications may be made within the scope of the appended claims.

[Exemplary Implementations]

Although specific exemplary implementations will be described below, the present invention is not limited to these exemplary implementations.

(Evaluation Method)

First, an evaluation method for the multicore cables made in accordance with the following exemplary implementations will be described.

(1) Adhesion of Second Cover Layer

The measurement was performed using the adhesion measuring jig 31 provided with the through hole that allows only the plurality of sheathed wires 11 illustrated in FIG. 3 to pass through.

First, the second cover layer 12 of the multicore cable 10, except for a portion thereof, is removed to expose the plurality of sheathed wires 11. In this state, the portion of the second cover layer 12 remains, so that the length L of the second cover layer 12 along the longitudinal direction of the multicore cable 10 becomes 35 mm, as illustrated in FIG. 3.

Further, the plurality of exposed sheathed wires 11 is inserted into the through hole of the adhesion measuring jig 31. Hence, the multicore cable 10 is set on the adhesion measuring jig 31, as illustrated in FIG. 3.

Next, the multicore cable 10 is pulled along the arrow A in FIG. 3 at a velocity of 200 mm/min, in a state where the adhesion measuring jig 31 fixed. Then, the second cover layer 12 is peeled off from the plurality of sheathed wires 11, and the magnitude of the force that is applied when the plurality of sheathed wires 11 passes through the through hole of the adhesion measuring jig 31 and moves below the adhesion measuring jig 31, is measured. The measured magnitude of the force may be the adhesion of the second cover layer with respect to the first cover layer per 35 mm length, and in Table 1 or the like, is referred to as the adhesion of the second cover layer.

(2) Chemical Resistance

The evaluation was performed based on JASO D 618: 2014, 6.11.2. However, the temperature of an aging tank when evaluating the multicore cables in accordance with each of the exemplary implementations was set the same as the temperature of the heat resistance obtained by the following heat resistance test. The evaluation result is rated A, which represents an excellent chemical resistance, when the chemical resistance is acceptable for all chemicals tested, and is rated B, which represents a poor chemical resistance, when the chemical resistance is not acceptable for some or all chemicals tested.

(3) Heat Resistance

The evaluation was performed based on JASO D 609: 2012, and the heat resistance is obtained for the 10,000-hour continuous use standard.

(4) Core Collapse

In an arbitrary cross section perpendicular to the longitudinal direction of the multicore cables made in accordance with each of the exemplary implementations, the evaluation result is rated A, which represents a reduced core collapse, when the thickness of a thinnest portion of the first cover layer of the two sheathed wires is greater than or equal to 80% of a predetermined standard thickness, and is rated B, which represents a core collapse, when the thickness of the thinnest portion is less than 80% of the predetermined standard thickness.

(5) Workability

With respect to the multicore cables made in accordance with each of the exemplary implementations, the evaluation result is rated A, which represents an excellent workability, when 50 mm of the second layer is peeled along the longitudinal direction and no second cover layer remaining on the surface of the first cover layer is visually confirmed. The evaluation result is rated B, which represents a poor workability, when 50 mm of the second layer is peeled along the longitudinal direction and the second cover layer remaining on the surface of the first cover layer is visually confirmed.

The multicore cables in accordance with each of the exemplary implementations will be described in the following. Exemplary implementations 1 through 5 correspond to embodiments, and exemplary implementations 6 through 8 correspond to comparative examples.

(Exemplary Implementation 1)

The conductor 111 having a cross sectional area of 0.5 $mm^2$ was prepared, by twisting 19 soft copper wires having a diameter of 0.19 mm.

The surface of the conductor 111 was covered with the fluoroelastomer by disposing the fluoroelastomer on the outer periphery of the conductor 111 using extrusion molding (first covering step).

A mixture of a TFE-P copolymer and an E-TFE copolymer was used as the fluoroelastomer. In the first covering step, the coverage was made so that the outer diameter of the first cover layer becomes 1.55 mm.

Next, a crosslinking treatment (first crosslinking step) using ionizing radiation was performed on the fluoroelastomer disposed on the surface of conductor 111. The electron radiation was used for the ionizing radiation.

The two sheathed wires 11 obtained by the first crosslinking step were twisted (twisting step), so that the twist pitch becomes 5 mm.

The surface of the plurality of sheathed wires 11 was covered with the fluoroelastomer, by disposing the fluoroelastomer on the outer periphery of the plurality of twisted sheathed wires, using the extrusion molding (second covering step).

A mixture of a TFE-P copolymer and an E-TFE copolymer was used as the fluoroelastomer. In the second covering step, the coverage was made so that the outer diameter of the second cover layer becomes 3.9 mm.

Next, a crosslinking treatment (second crosslinking step) using ionizing radiation was performed on the fluoroelastomer disposed on the surface of the plurality of sheathed wires 11. The electron radiation was used for the ionizing radiation. Because the electron radiation also reaches the first cover layer when the second crosslinking step is performed, the first cover layer is again subjected to the crosslinking treatment when the second crosslinking step is performed.

The evaluations described above are made with respect to the obtained multicore cables. The evaluation results are illustrated in Table 1.

(Exemplary Implementation 2)

The twist pitch was set to 10 mm in the twisting step, but the multicore cable was otherwise made and evaluated in a similar manner as the exemplary implementation 1. The evaluation results are illustrated in Table 1.

(Exemplary Implementation 3)

In the first covering step, a fluororesin was used as the resin disposed on the outer periphery of the conductor 111, and the coverage was made so that the outer diameter of the first cover layer becomes 1.45 mm. An ETFE, which is a copolymer of ethylene and tetrafluoroethylene, was used as the fluororesin.

In addition, in the second covering step, the second cover layer was formed so that the outer diameter of the second cover layer becomes 3.8 mm.

Except for the points described above, the multicore cable was made and evaluated in a similar manner as the exemplary implementation 2. The evaluation results are illustrated in Table 1.

(Exemplary Implementation 4, Exemplary Implementation 5)

Except for the twist pitch which is set to values illustrated in Table 1 in the twisting step, the multicore cables were made and evaluated in a similar manner as the exemplary implementation 3. The evaluation results are illustrated in Table 1.

(Exemplary Implementation 6)

PVC (polyvinyl chloride) was used as the resin disposed on the outer periphery of the conductor in the first covering step, and the outer periphery of the plurality of sheathed wires in the second covering step, and no second crosslinking step was performed. In the following description, Table 1, or the like, polyvinyl chloride is simply referred to as PVC.

In the first covering step, the coverage was made so that the outer diameter of the first cover layer becomes 1.6 mm, and in the second covering step, the coverage was made so that the outer diameter of the second cover layer becomes 4 mm.

Except for the points described above, the multicore cable was made and evaluated in a similar manner as the exemplary implementation 1. The evaluation results are illustrated in Table 1.

(Exemplary Implementation 7)

PE (polyethylene) was used as the resin disposed on the outer periphery of the conductor in the first covering step, and PVC was used as the resin disposed on the outer periphery of the plurality of sheathed wires in the second covering step. In addition, no second crosslinking step was performed. In the following description, Table 1, or the like, polyethylene is simply referred to as PE.

In the first covering step, the coverage was made so that the outer diameter of the first cover layer becomes 1.6 mm, and in the second covering step, the coverage was made so that the outer diameter of the second cover layer becomes 4 mm.

Except for the points described above, the multicore cable was made and evaluated in a similar manner as the exemplary implementation 1. The evaluation results are illustrated in Table 1.

(Exemplary Implementation 8)

PE was used as the resin disposed on the outer periphery of the conductor in the first covering step, and the outer periphery of the plurality of sheathed wires in the second covering step.

In the first covering step, the coverage was made so that the outer diameter of the first cover layer becomes 1.6 mm, and in the second covering step, the coverage was made so that the outer diameter of the second cover layer becomes 4 mm.

Except for the points described above, the multicore cable was made and evaluated in a similar manner as the exemplary implementation 1. The evaluation results are illustrated in Table 1.

TABLE 1

| | | Exemplary Implementation 1 | Exemplary Implementation 2 | Exemplary Implementation 3 | Exemplary Implementation 4 | Exemplary Implementation 5 | Exemplary Implementation 6 | Exemplary Implementation 7 | Exemplary Implementation 8 |
|---|---|---|---|---|---|---|---|---|---|
| Configuration of multicore cable | Cross sectional area of conductor ($mm^2$) | 0.5 | 0.5 | 0.5 | 0.5 | 0.5 | 0.5 | 0.5 | 0.5 |
| | First cover layer Material | Crosslinked fluoroelastomer | Crosslinked fluoroelastomer | Crosslinked fluororesin | Crosslinked fluororesin | Crosslinked fluororesin | Crosslinked PVC | Crosslinked PE | Crosslinked PE |
| | Outer diameter (mm) | 1.55 | 1.55 | 1.45 | 1.45 | 1.45 | 1.6 | 1.6 | 1.6 |

TABLE 1-continued

|  |  |  | Exemplary Implementation 1 | Exemplary Implementation 2 | Exemplary Implementation 3 | Exemplary Implementation 4 | Exemplary Implementation 5 | Exemplary Implementation 6 | Exemplary Implementation 7 | Exemplary Implementation 8 |
|---|---|---|---|---|---|---|---|---|---|---|
|  | Twist pitch (mm) |  | 5 | 10 | 10 | 30 | 60 | 5 | 5 | 5 |
|  | Second cover layer | Material | Crosslinked fluoroelastomer | Crosslinked fluoroelastomer | Crosslinked fluoroelastomer | Crosslinked fluoroelastomer | Crosslinked fluoroelastomer | PVC | PVC | Crosslinked PE |
|  |  | Outer diameter (mm) | 3.9 | 3.9 | 3.8 | 3.8 | 3.8 | 4 | 4 | 4 |
|  |  | Thickness (mm) | 0.4 | 0.4 | 0.45 | 0.45 | 0.45 | 0.4 | 0.4 | 0.4 |
| Evaluation result | Adhesion of second cover layer (N) |  | 148 | 71 | 63 | 32 | 21 | 68 | 38 | 165 |
|  | Chemical resistance |  | A | A | A | A | A | B | B | B |
|  | Heat resistance (° C.) |  | 200 | 200 | 200 | 200 | 200 | ~105 | ~105 | ~125 |
|  | Core collapse |  | B | B | A | A | A | A | B | B |
|  | Workability |  | B | A | A | A | A | A | A | B |

According to the evaluation results illustrated in Table 1, the multicore cables in accordance with the exemplary implementations 1 through 5 have a chemical resistance that is rated A, and a heat resistance of 200° C., and it was confirmed that these multicore cables have excellent heat resistance and excellent chemical resistance. On the other hand, according to the evaluation results, the multicore cables in accordance with the exemplary implementations 6 through 8 have a chemical resistance that is rated B, and a heat resistance of 125° C. or lower, or 105° C. or lower, and it was confirmed that both the chemical resistance and the heat resistance of these multicore cables are poorer when compared to those of the exemplary implementations 1 through 5.

The multicore cables in accordance with the exemplary implementations 1 through 5 use the crosslinked fluororesin or the crosslinked fluoroelastomer as the material of the first cover layer, and use the crosslinked fluoroelastomer as the material of the second cover layer. It may be regarded that, by crosslinking both of these materials covering the conductors, the heat decomposition temperature increases, thereby increasing the heat resistance. In addition, it may be regarded that, by using the fluorine-based resin or elastomer as the material of the first and second cover layers, the chemical resistance is increased.

DESCRIPTION OF REFERENCE NUMERALS

10 Multicore cable
11 Sheathed wire
111 Conductor
112 First cover layer
12 Second cover layer
13 Lubricant
20 Harness
21A, 21B Connector
31 Adhesion measuring jig
O Circumscribed circle
T Thickness
A Arrow
L Length
$L_{10}$ Length

The invention claimed is:

1. A multicore cable comprising:
   a plurality of sheathed wires, each sheathed wire of the plurality of sheathed wires including a conductor, and a first cover layer covering the conductor;
   a second cover layer covering an outer periphery of the plurality of sheathed wires; and
   a lubricant disposed between the first cover layer and the second cover layer,
   wherein the first cover layer is formed of a crosslinked fluororesin, and a copolymer of ethylene and tetrafluoroethylene is used as a fluororesin of the crosslinked fluororesin,
   wherein the second cover layer is formed of a crosslinked fluoroelastomer, and a material selected from a group consisting of a tetrafluoroethylene/propylene copolymer (TFE-P copolymer), a vinylidene fluoride rubber (FKM), a mixture of a TFE-P copolymer and an ethylene/tetrafluoroethylene copolymer (E-TFE copolymer), and a mixture of FKM and polyvinylidene fluoride (PVDF), is used as a fluoroelastomer of the crosslinked fluoroelastomer, and
   wherein an adhesion of the second cover layer with respect to the first cover layer is in a range greater than or equal to 20 N and less than or equal to 150 N per 35 mm in length.

2. The multicore cable as claimed in claim 1, wherein the plurality of sheathed wires is twisted, and has a twist pitch in a range greater than or equal to 5 mm and less than or equal to 60 mm.

3. The multicore cable as claimed in claim 1, wherein a thickness of the second cover layer is in a range greater than or equal to 0.1 mm and less than or equal to 0.6 mm.

4. A harness comprising:
   the multicore cable according to claim 1; and
   connectors disposed at both ends along a longitudinal direction of the multicore cable.

* * * * *